W. HARGREAVES.
SAFETY VALVE.
APPLICATION FILED OCT. 30, 1919.

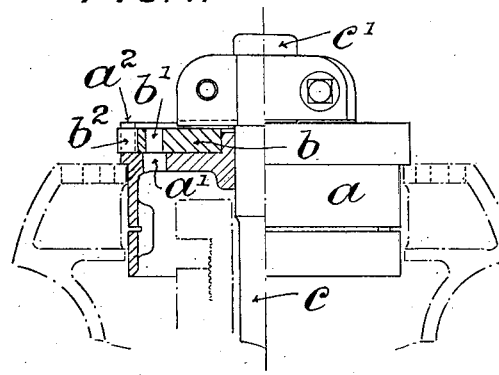
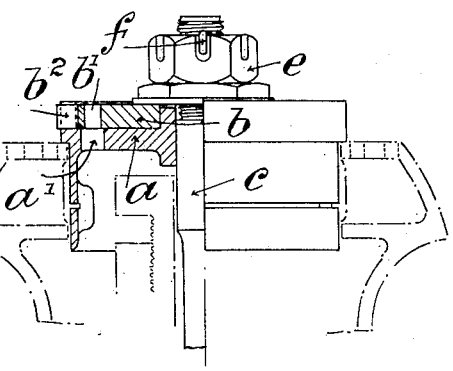
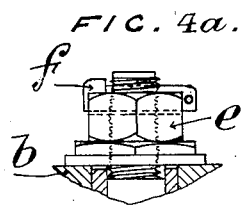
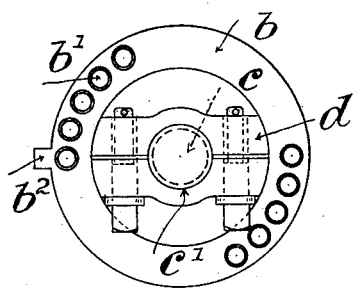
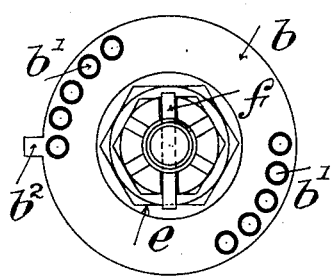
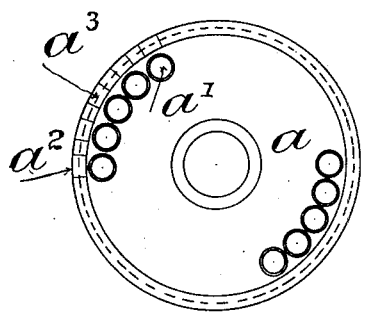
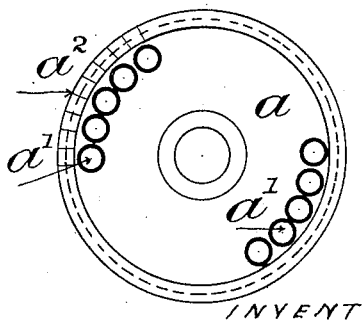

1,404,390.

Patented Jan. 24, 1922.
2 SHEETS—SHEET 2.

INVENTOR:
William Hargreaves
By Wm Wallace White
ATTY.

UNITED STATES PATENT OFFICE.

WILLIAM HARGREAVES, OF CHORLTON-CUM-HARDY, MANCHESTER, ENGLAND, ASSIGNOR OF ONE-HALF TO R. L. ROSS AND COMPANY LIMITED, OF STOCKPORT, ENGLAND.

SAFETY VALVE.

1,404,390. Specification of Letters Patent. Patented Jan. 24, 1922.

Application filed October 30, 1919. Serial No. 334,619.

*To all whom it may concern:*

Be it known that I, WILLIAM HARGREAVES, a subject of the King of Great Britain and Ireland, residing at Chorlton-cum-Hardy, Manchester, in the county of Lancaster, England, have invented new and useful Improvements in or Connected with Safety Valves, of which the following is a specification.

This invention relates to safety valves of the "Ross" type, such, for instance, as those described in British Patents Nos. 22218 of 1902, 12471 of 1904, and 19888 of 1912, and which are styled muffled pop safety valves.

In such valves a liftable secondary area, or its equivalent, is used in which holes are drilled, and, over such, a rotatable plate with corresponding holes drilled therein has been fitted, adjustment of such rotatable plate opening up or diminishing steam passage way through said holes, as is known.

Such rotatable plate has had a turned-up rim with radial gaps cut therein and the rotatable plate has been held in position by a deep cotter passed through the spindle so as to engage a slot in the spindle and one of said gaps, the cotter being padlocked or sealed after any adjustment.

It is found that this arrangement is not so neat or compact as is desirable and adds to the height of the valve preventing same from being fitted to certain modern locomotives, or to other boilers or the like where little head room is available.

The drawings illustrate my improvements:

Fig. 1 is an elevation partly in section showing one form of my invention, the view showing secondary area adjustable plate, and a locking or sealing device.

Fig. 2 shows the adjustable or rotatable plate and a locking or sealing device.

Fig. 3 is a plan of the secondary area.

Fig. 4 shows a modification in the locking means.

Fig. 4ª is a detail view of the locking means taken at right angles to the position Fig. 4.

Fig. 5 is a plan of the adjustable or rotatable plate, and,

Fig. 6 is a plan of the secondary area.

Figure 7:
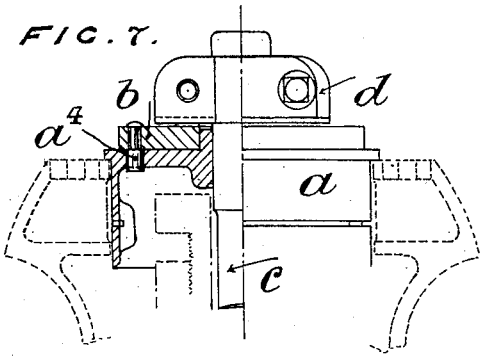

Fig. 7 indicates a modification in the manner of effecting a connection between the adjustable or rotatable plate and the secondary area.

Figure 8:
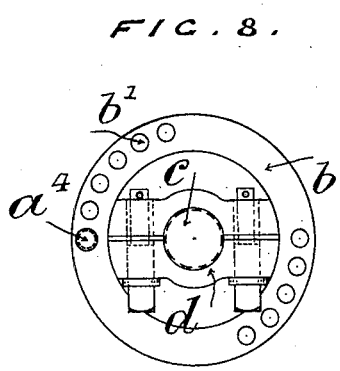
Figure 9:
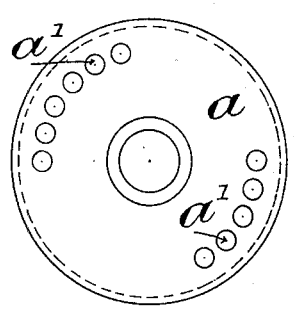

Fig. 8 is a separate plan of the adjustable or rotatable plate, and,

Fig. 9 shows a plan of the secondary area.

The secondary area $a$ is of suitable design and construction.

I still provide steam outlet holes $a'$ through the secondary area $a$ and the same has conveniently an outer ledge or ring $a^2$ projecting upwards. Gaps $a^3$ are cut in such ledge or ring $a^2$, and a flat rotatable plate $b$ fits over the valve spindle $c$ and rests on the secondary area $a$ but preferably does not rise beyond the height of the outer ledge. This rotatable plate $b$ has holes $b'$ bored therein, and has a lug or finger $b^2$ capable of engaging one of the gaps $a^3$. Adjustment of the rotatable plate $b$ to increase or diminish the number of outlet holes uncovered in the secondary area $a$ is made by slightly lifting such plate $b$ until the lug or finger $b^2$ clears the gap when said plate may be turned or adjusted. To prevent adjustment being interfered with, I apply a collar or clip $d$ made in two or more parts which is fixed around the valve spindle $c$, and, when once applied, prevents the rotatable plate $b$ from being lifted so that the lug cannot clear its particular gap. The removable collar or clip $d$ is applied below a collar or the like $c'$ formed on the valve spindle $c$, and may be held by bolts, or other devices which will hold the two halves $d$ together, and such fastenings may be sealed, pinned, padlocked, or be otherwise guarded against interference.

Instead of a removable collar made in halves or parts, lock-nuts or like shallow fastenings may be used to embrace and engage the spindle or prevent unauthorized movement of the flat adjustable or rotatable plate. Such a construction is well shown by Figs. 4 to 6. In this case the valve spindle $c$ has a screw thread cut thereon. A combined washer and lock-nut $e$ is applied and the spindle and upper part of the nut is slotted (see Figs. 4ª and 5). When the required adjustment has been secured, the key $f$ is passed through the slots in the lock-nut and spindle and thereafter is pinned, padlocked, sealed or otherwise fixed to prevent tampering.

A further modification is illustrated in Figs. 7 to 9. In this case, instead of the ledge or ring $a^2$, the adjustable or rotatable plate $b$ has a round pin $a^4$ fixed to it, such pin engaging one or other of the holes $a'$ in the secondary area $a$ when the said plate and area lie together after adjustment. The removable collar or clip fixing means common to Figs. 1 to 3 are shown, but obviously the lock-nut holding arrangement Figs. 4 to 6 may be used as a variation.

In the Figs. 4 to 9 like parts to those shown in Figs. 1 to 3 are marked with similar letters of reference.

I declare that what I claim is.

1. A safety valve having a liftable secondary area, the face of which is external to the valve casing, said secondary area having a ledge seating on the top of said casing, a spindle supporting said valve, said secondary area having a series of openings therethrough, an external rotatable plate over said secondary area, interconnecting means between the secondary area and the rotatable plate, a shallow locking device on the spindle clamping the abutting secondary area and the rotatable plate, and safety appliances fixed to the locking device, said locking device being entirely external and at the edge of the safety valve casing.

2. In a safety valve, a liftable secondary area the face of which is external to the valve casing, said area having a ledge seating on the top of said casing, a spindle for said secondary area, a rotatable abutting plate external to the casing and above said secondary area, interconnecting means for said area and external plate, a shallow clamping device fitting about the spindle and clamping said secondary area and rotatable plate when they abut, and safety devices on the shallow clamping device fitting the spindle.

3. In a safety valve, a spindle, a liftable secondary area on the spindle, said area having a face external to the valve casing and a ledge seating on the top of said casing, the said secondary area being also provided with a series of openings, a rotatable plate fitting said liftable secondary area external to the valve casing and having a series of openings, interconnecting means between secondary area and rotatable plate, a shallow clamping device about the spindle external to the valve casing and locking the secondary area and rotatable plate, and a safety device on said shallow clamping device.

In testimony whereof I have signed my name to this specification.

WILLIAM HARGREAVES.